US008923197B2

(12) United States Patent
Pi et al.

(10) Patent No.: US 8,923,197 B2
(45) Date of Patent: Dec. 30, 2014

(54) METHODS AND APPARATUS TO TRANSMIT AND RECEIVE SYNCHRONIZATION SIGNAL AND SYSTEM INFORMATION IN A WIRELESS COMMUNICATION SYSTEM

(75) Inventors: Zhouyue Pi, Allen, TX (US); Ying Li, Garland, TX (US); Farooq Khan, Allen, TX (US)

(73) Assignee: Samsung Electronics Co., Ltd., Suwon-Si (KR)

( * ) Notice: Subject to any disclaimer, the term of this patent is extended or adjusted under 35 U.S.C. 154(b) by 234 days.

(21) Appl. No.: 13/482,612

(22) Filed: May 29, 2012

(65) Prior Publication Data

US 2012/0307726 A1 Dec. 6, 2012

Related U.S. Application Data

(60) Provisional application No. 61/492,262, filed on Jun. 1, 2011.

(51) Int. Cl.
*H04W 4/00* (2009.01)
*H04L 5/00* (2006.01)
*H04J 11/00* (2006.01)
*H04L 27/26* (2006.01)
*H04W 76/02* (2009.01)

(52) U.S. Cl.
CPC ........... *H04J 11/0069* (2013.01); *H04L 5/0053* (2013.01); *H04L 27/2601* (2013.01); *H04L 27/2613* (2013.01); *H04L 27/2655* (2013.01); *H04W 76/02* (2013.01)
USPC ........................................................ 370/328

(58) Field of Classification Search
CPC .......... H04L 25/03178–25/0337; H04W 56/00
USPC .......................................... 370/328, 350, 503
See application file for complete search history.

(56) References Cited

U.S. PATENT DOCUMENTS

| | | | |
|---|---|---|---|
| 2007/0010280 A1* | 1/2007 | Zalio et al. ..................... | 455/525 |
| 2009/0103590 A1* | 4/2009 | Dabak et al. .................. | 375/130 |
| 2010/0099408 A1 | 4/2010 | Han et al. | |
| 2010/0110873 A1 | 5/2010 | Han et al. | |
| 2010/0135257 A1 | 6/2010 | Higuchi et al. | |
| 2010/0172341 A1* | 7/2010 | Park et al. ..................... | 370/350 |
| 2010/0260169 A1* | 10/2010 | Gheorghiu et al. ........... | 370/350 |
| 2010/0296429 A1* | 11/2010 | Han et al. ...................... | 370/312 |
| 2011/0090860 A1 | 4/2011 | Ihm et al. | |
| 2011/0243022 A1* | 10/2011 | Tandai et al. ................. | 370/252 |

OTHER PUBLICATIONS

International Search Report dated Dec. 3, 2012 in connection with International Patent Application No. PCT/KR2012/004351, 4 pages.
Written Opinion of International Searching Authority dated Dec. 3, 2012 in connection with International Patent Application No. PCT/KR2012/004351, 4 pages.

* cited by examiner

*Primary Examiner* — Hoon J Chung
*Assistant Examiner* — Yaotang Wang

(57) ABSTRACT

A base station transmits a plurality of primary synchronization channel (PSC) symbols to a mobile station in a slot of a subframe of a frame-based wireless communication system. The base station also transmits a plurality of secondary synchronization channel (SSC) symbols to the mobile station in the slot of the subframe. The mobile station determines a preferred receiver beam based on the plurality of received consecutive PSC symbols.

21 Claims, 13 Drawing Sheets

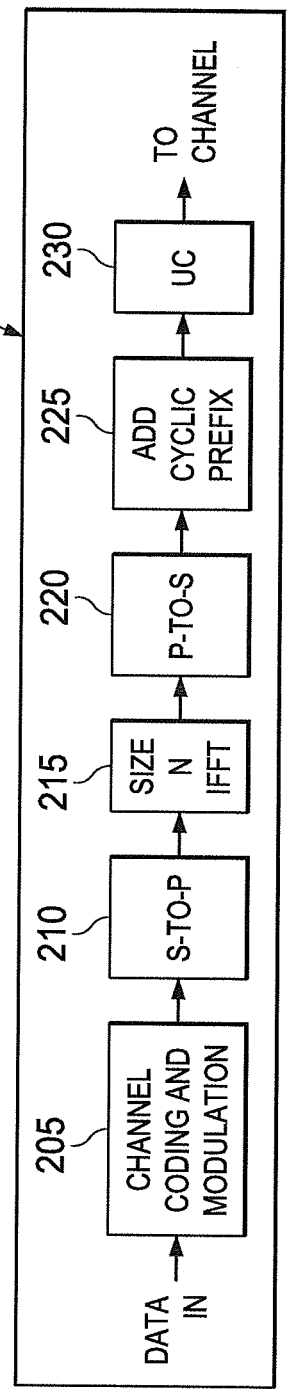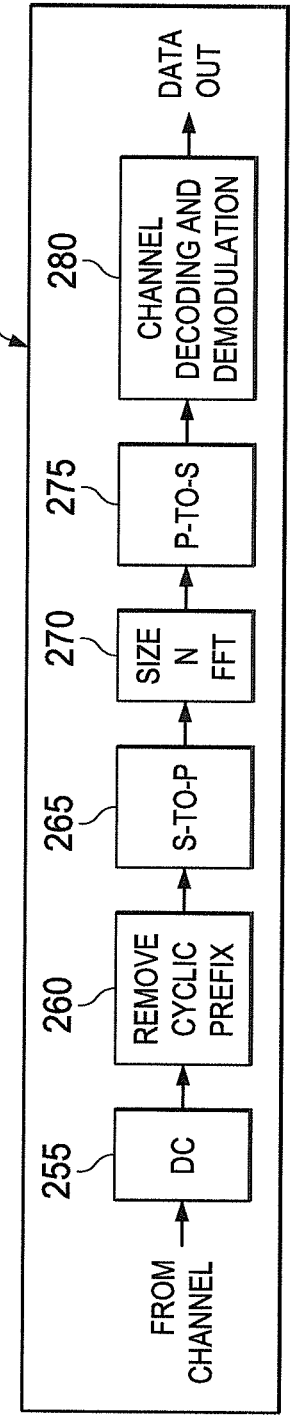

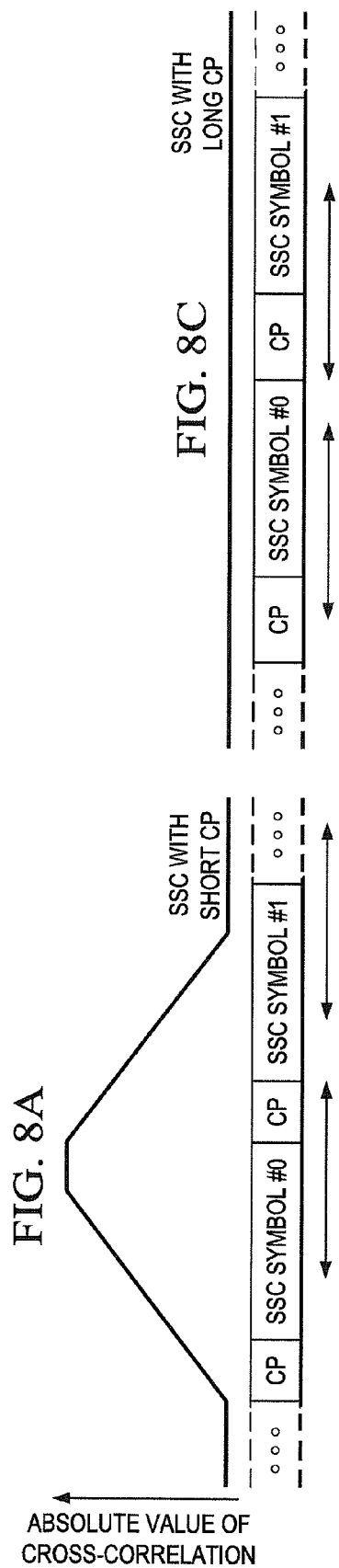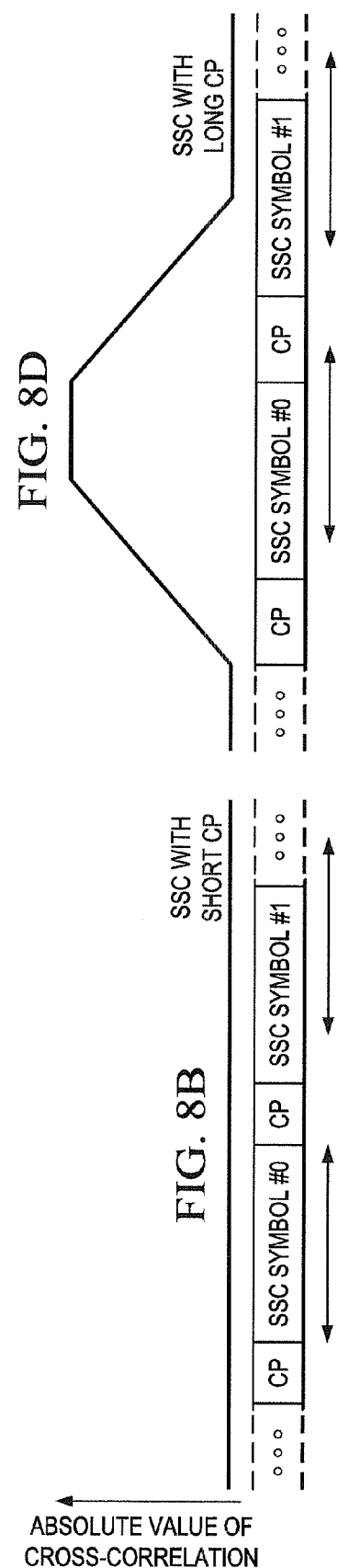

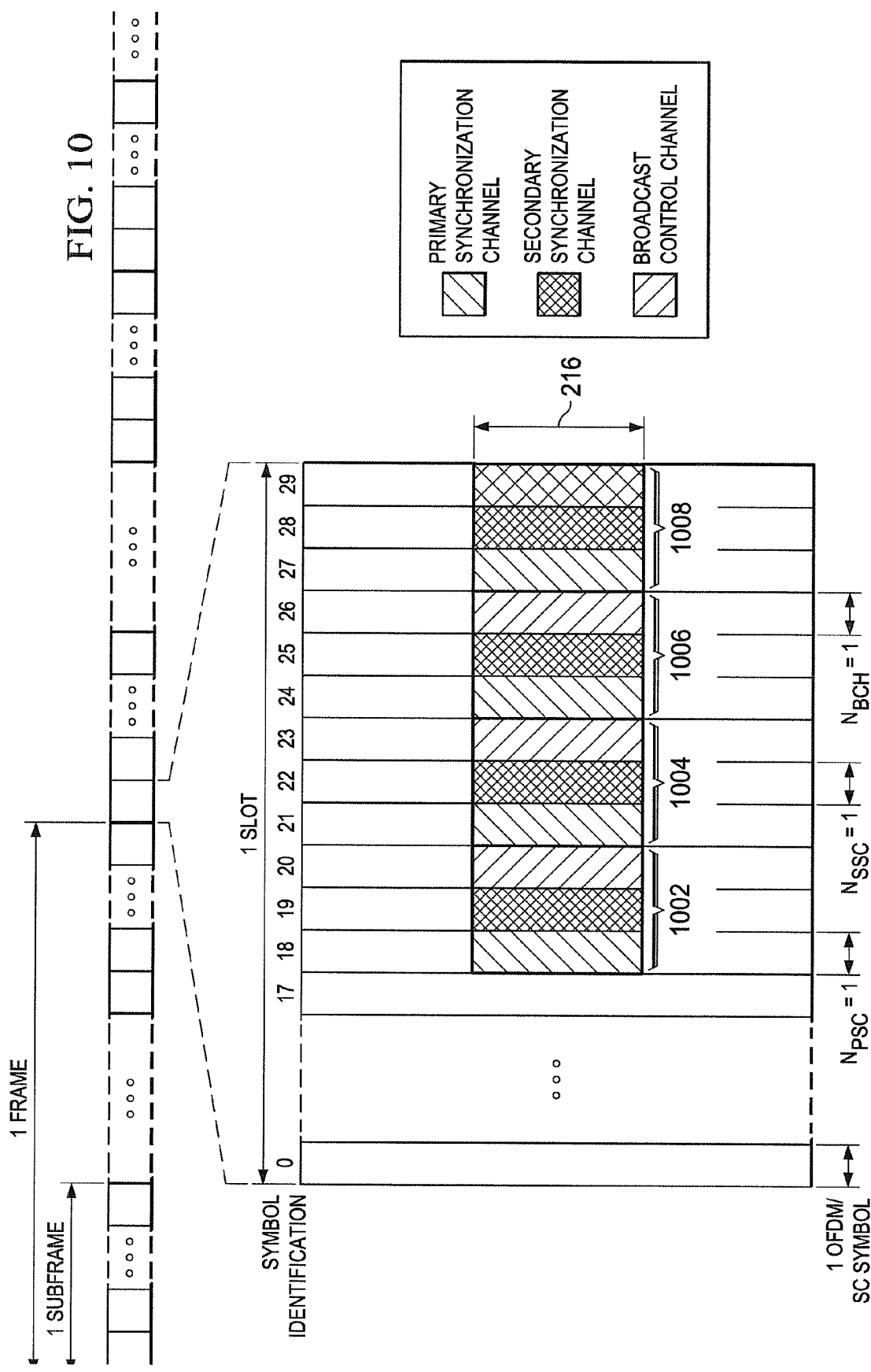

METHODS AND APPARATUS TO TRANSMIT AND RECEIVE SYNCHRONIZATION SIGNAL AND SYSTEM INFORMATION IN A WIRELESS COMMUNICATION SYSTEM

CROSS-REFERENCE TO RELATED APPLICATION(S) AND CLAIM OF PRIORITY

The present application is related to U.S. Provisional Patent Application No. 61/492,262, filed Jun. 1, 2011, entitled "METHODS AND APPARATUS TO TRANSMIT AND RECEIVE SYNCHRONIZATION SIGNAL AND SYSTEM INFORMATION IN A MOBILE COMMUNICATION SYSTEM". Provisional Patent Application No. 61/492,262 is assigned to the assignee of the present application and is hereby incorporated by reference into the present application as if fully set forth herein. The present application hereby claims priority under 35 U.S.C. §119(e) to U.S. Provisional Patent Application No. 61/492,262.

TECHNICAL FIELD

The present application relates generally to wireless communications and, more specifically, to a method and apparatus to transmit and receive synchronization signal and system information in a wireless communication system.

BACKGROUND

Mobile communication has been one of the most successful innovations in modern history. Recently, the number of subscribers to mobile communication services exceeded 5 billion and continues to grow quickly. At the same time, new mobile communication technologies are being developed to satisfy the increasing demand and to provide more and better mobile communication applications and services. Some examples of such systems are cdma2000 and 1xEV-DO systems developed by 3GPP2; WCDMA, HSPA, and LTE systems developed by 3GPP; and mobile WiMAX systems developed by IEEE. As more and more people become users of mobile communication systems, and more and more services are provided over these systems, there is an increasing need for mobile communication systems with larger capacity, higher throughput, lower latency, and better reliability.

SUMMARY

A method for use in a base station is provided. The method includes transmitting a plurality of primary synchronization channel (PSC) symbols to a mobile station in a slot of a subframe of a frame-based wireless communication system. The method also includes transmitting a plurality of secondary synchronization channel (SSC) symbols to the mobile station in the slot of the subframe.

A base station having a transmitter path is provided. The transmitter path is configured to transmit a plurality of PSC symbols to a mobile station in a slot of a subframe of a frame-based wireless communication system. The transmitter path is also configured to transmit a plurality of SSC symbols to the mobile station in the slot of the subframe.

A mobile station having a receiver path is provided. The receiver path is configured to receive a plurality of PSC symbols from a base station in a slot of a subframe of a frame-based wireless communication system. The receiver path is also configured to receive a plurality of SSC symbols from the base station in the slot of the subframe.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 2 illustrates a high-level diagram of an orthogonal frequency division multiple access (OFDMA) transmitter path according to an embodiment of this disclosure;

FIG. 3 illustrates a high-level diagram of an OFDMA receiver path according to an embodiment of this disclosure;

FIGS. 8A through 8D illustrates detection of cyclic prefix (CP) configuration and symbol timing using secondary synchronization channel (SSC) symbols, according to an embodiment of this disclosure;

FIG. 10 illustrates another format for transmitting synchronization signals and system information in a 5G system, according to embodiments of this disclosure;

DETAILED DESCRIPTION

Figure 1:
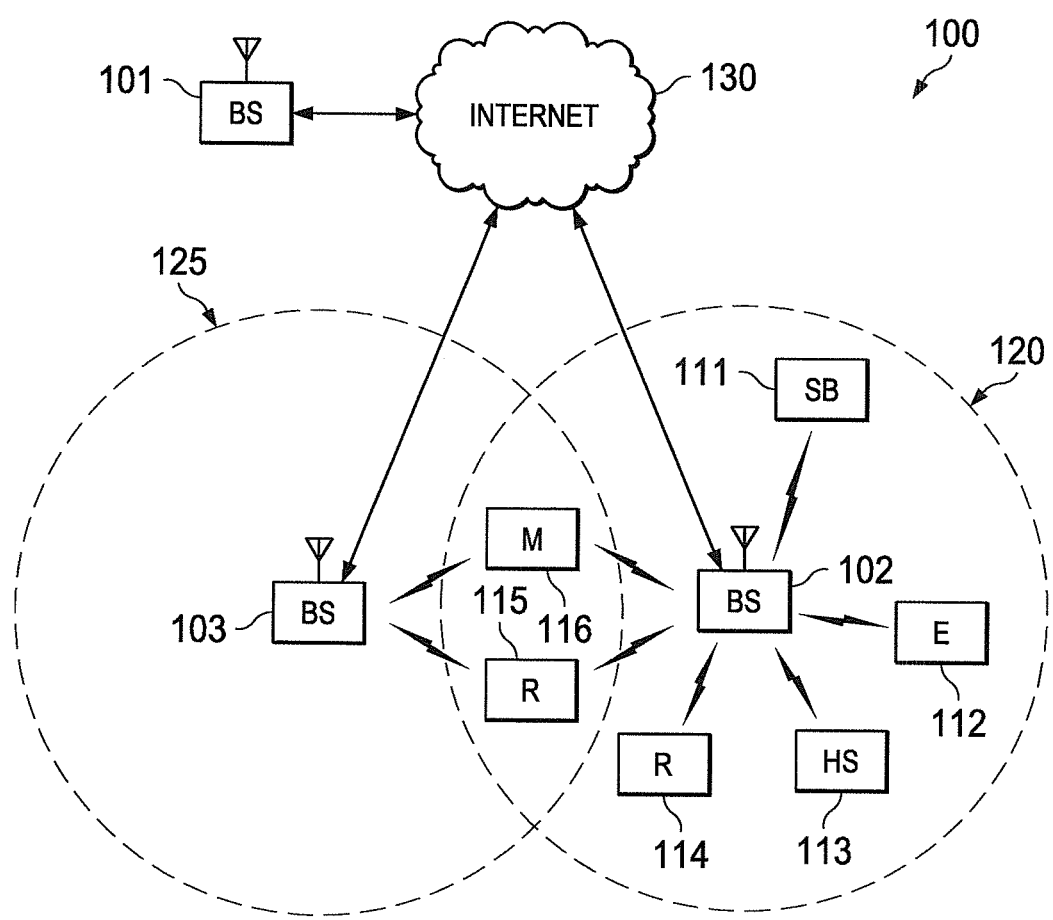
FIG. 1 illustrates a wireless communication network according to embodiments of this disclosure.

FIGS. 1 through 12, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

The following documents and standards descriptions are hereby incorporated into the present disclosure as if fully set forth herein: (i) "Millimeter Wave Propagation: Spectrum Management Implications", Federal Communications Commission, Office of Engineering and Technology, Bulletin Number 70, July 1997 (hereinafter "REF1"); (ii) Zhouyue Pi, Farooq Khan, "An Introduction To Millimeter-Wave Mobile Broadband Systems", IEEE Communications Magazine, June 2011 (hereinafter "REF2"); (iii) 3GPP Technical Specification No. 36.201, "Evolved Universal Terrestrial Radio Access (E-UTRA); Physical Layer—General Description" (hereinafter "REF3"); (iv) 3GPP Technical Specification No. 36.211, "Evolved Universal Terrestrial Radio Access (E-UTRA); Physical Channels And Modulation" (hereinafter "REF4"); (v) 3GPP Technical Specification No. 36.212, "Evolved Universal Terrestrial Radio Access (E-UTRA); Multiplexing And Channel Coding" (hereinafter "REF5"); (vi) 3GPP Technical Specification No. 36.213, "Evolved Universal Terrestrial Radio Access (E-UTRA); Physical Layer Procedures" (hereinafter "REF6"); (vii) 3GPP Technical Specification No. 36.214, "Evolved Universal Terrestrial Radio Access (E-UTRA); Physical Layer—Measurements" (hereinafter "REF7"); and (viii) U.S. Provisional Patent Application No. 61/434,687 to Zhouyue Pi, titled "Methods And Apparatus For Fast Synchronization Using Tail Biting Convolution Codes", and filed Jan. 20, 2011 (hereinafter "REF8").

Millimeter waves typically refer to radio waves with wavelengths in the range of 1 mm-10 mm, which corresponds to a radio frequency of 30 GHz-300 GHz. These radio waves exhibit unique propagation characteristics. (See also REF1). For example, compared with lower frequency radio waves, millimeter waves are associated with higher propagation loss, have poorer ability to penetrate objects, such as buildings, walls, foliage, and are more susceptible to atmosphere absorption, deflection and diffraction due to particles (e.g., rain drops) in the air. Alternatively, due to their smaller wavelengths, more millimeter wave antennas can be placed in a relatively small area, thus enabling high-gain antennas in a small form factor. In addition, due to the aforementioned perceived disadvantages, these radio waves have been less utilized than other lower frequency radio waves. Accordingly, some businesses may acquire spectrum in this band at a lower cost.

Vast amounts of spectrum are available in the millimeter wave band. For example, the frequencies around 60 GHz (which are typically referred to as the 60 GHz band) are available as unlicensed spectrum in many countries around the world. In the United States, 7 GHz of spectrum around 60 GHz (57 GHz-64 GHz) is allocated for unlicensed use. On Oct. 16, 2003, the Federal Communications Commission (FCC) issued a Report and Order that allocated 12.9 GHz of spectrum for high-density fixed wireless services in the United States (namely, 71-76 GHz, 81-86 GHz, and 92-95 GHz excluding the 94.0-94.1 GHz for Federal Government use). The frequencies in 71-76 GHz, 81-86 GHz, and 92-95 GHz are collectively referred to as the E-band.

Several companies are developing millimeter wave communication systems that can achieve gigabit/sec (Gbps) data rates. However, these technologies are not suitable for commercial mobile communication due to issues such as cost, complexity, power consumption, and form factor. The component electronics used in these systems, including power amplifiers, low noise amplifiers, mixers, oscillators, synthesizers, waveguides, are too big in size and consume too much power to be applicable in mobile communication.

Recently, many engineering and business efforts have attempted to utilize the millimeter waves for short-range wireless communication. A few companies and industrial consortiums have developed technologies and standards to transmit data at Gbps rates using the unlicensed 60 GHz band within a few meters (i.e., up to 10 meters). Several industrial standards have been developed (e.g., WirelessHD technology, ECMA-387, and IEEE 802.15.3c), with other organizations also actively developing competing short-range 60 GHz Gbps connectivity technology, such as the Wireless Gigabit Alliance (WGA) and the IEEE 802.11 task group ad (TGad). Integrated circuit (IC) based transceivers are also available for some of these technologies.

In REF2, a millimeter-wave mobile broadband system is described. Vast spectrum and small antenna element sizes are associated with millimeter waves, making millimeter wave very attractive to support next generation (5G) high data rate mobile communication. In order to overcome the unfavorable propagation characteristics, and to achieve much higher energy efficiency (energy per bit delivered over the air), transmitter and receiver beamforming may be used in millimeter-wave mobile broadband communication. Thus, innovative schemes to transmit and receive synchronization signals and system information in such a system with transmitter and receiver beamforming are desirable.

In accordance with this disclosure, methods and apparatus to transmit and receive synchronization signal and system information in a next generation (5G) mobile communication system with transmitter and receiver beamforming are described. It is noted that, although embodiments of this disclosure are described in accordance with millimeter wave communication, the embodiments of this disclosure are certainly applicable in other communication mediums, e.g., radio waves with frequency of 3 GHz-30 GHz that exhibit similar properties as millimeter waves. Additionally, some embodiments of this disclosure are also applicable to electromagnetic waves with terahertz frequencies, infrared, visible light, and other optical media.

FIG. 1 illustrates a wireless communication network, according to embodiments of this disclosure. The embodiment of wireless communication network 100 illustrated in FIG. 1 is for illustration only. Other embodiments of the wireless communication network 100 could be used without departing from the scope of this disclosure.

In the illustrated embodiment, the wireless communication network 100 includes base station (BS) 101, base station (BS) 102, base station (BS) 103, and other similar base stations (not shown). Base station 101 is in communication with base station 102 and base station 103. Base station 101 is also in communication with Internet 130 or a similar IP-based system (not shown).

Base station 102 provides wireless broadband access (via base station 101) to Internet 130 to a first plurality of subscriber stations (also referred to herein as mobile stations) within coverage area 120 of base station 102. The first plurality of subscriber stations includes subscriber station 111, which may be located in a small business (SB), subscriber station 112, which may be located in an enterprise (E), subscriber station 113, which may be located in a WiFi hotspot (HS), subscriber station 114, which may be located in a first residence (R), subscriber station 115, which may be located in a second residence (R), and subscriber station 116, which may be a mobile device (M), such as a cell phone, a wireless laptop, a wireless PDA, or the like.

Base station 103 provides wireless broadband access (via base station 101) to Internet 130 to a second plurality of subscriber stations within coverage area 125 of base station 103. The second plurality of subscriber stations includes subscriber station 115 and subscriber station 116. In an exemplary embodiment, base stations 101-103 may communicate with each other and with subscriber stations 111-116 using OFDM or OFDMA techniques.

While only six subscriber stations are depicted in FIG. 1, it is understood that the wireless communication network 100 may provide wireless broadband access to additional subscriber stations. It is noted that subscriber station 115 and subscriber station 116 are located on the edges of both coverage area 120 and coverage area 125. Subscriber station 115 and subscriber station 116 each communicate with both base station 102 and base station 103 and may be said to be operating in handoff mode, as known to those of skill in the art.

Subscriber stations 111-116 may access voice, data, video, video conferencing, and/or other broadband services via Internet 130. For example, subscriber station 116 may be any of a number of mobile devices, including a wireless-enabled laptop computer, personal data assistant, notebook, handheld device, or other wireless-enabled device. Subscriber stations 114 and 115 may be, for example, a wireless-enabled personal computer (PC), a laptop computer, a gateway, or another device.

FIG. 2 is a high-level diagram of an orthogonal frequency division multiple access (OFDMA) transmit path. FIG. 3 is a high-level diagram of an OFDMA receive path. In FIGS. 2 and 3, the OFDMA transmit path 200 may be implemented, e.g., in base station (BS) 102 and the OFDMA receive path 300 may be implemented, e.g., in a subscriber station, such as subscriber station 116 of FIG. 1. It will be understood, however, that the OFDMA receive path 300 could be implemented in a base station (e.g. base station 102 of FIG. 1) and the OFDMA transmit path 200 could be implemented in a subscriber station.

Transmit path 200 comprises channel coding and modulation block 205, serial-to-parallel (S-to-P) block 210, Size N Inverse Fast Fourier Transform (IFFT) block 215, parallel-to-serial (P-to-S) block 220, add cyclic prefix block 225, up-converter (UC) 230. Receive path 300 comprises down-converter (DC) 255, remove cyclic prefix block 260, serial-to-parallel (S-to-P) block 265, Size N Fast Fourier Transform (FFT) block 270, parallel-to-serial (P-to-S) block 275, channel decoding and demodulation block 280.

At least some of the components in FIGS. 2 and 3 may be implemented in software while other components may be implemented by configurable hardware or a mixture of software and configurable hardware. In particular, it is noted that the FFT blocks and the IFFT blocks described in this disclosure document may be implemented as configurable software algorithms, where the value of Size N may be modified according to the implementation.

Furthermore, although this disclosure is directed to an embodiment that implements the Fast Fourier Transform and the Inverse Fast Fourier Transform, this is by way of illustration only and should not be construed to limit the scope of the disclosure. It will be appreciated that in an alternate embodiment of the disclosure, the Fast Fourier Transform functions and the Inverse Fast Fourier Transform functions may easily be replaced by Discrete Fourier Transform (DFT) functions and Inverse Discrete Fourier Transform (IDFT) functions, respectively. It will be appreciated that for DFT and IDFT functions, the value of the N variable may be any integer number (i.e., 1, 2, 3, 4, etc.), while for FFT and IFFT functions, the value of the N variable may be any integer number that is a power of two (i.e., 1, 2, 4, 8, 16, etc.).

In transmit path 200, channel coding and modulation block 205 receives a set of information bits, applies coding (e.g., LDPC coding) and modulates (e.g., Quadrature Phase Shift Keying (QPSK) or Quadrature Amplitude Modulation (QAM)) the input bits to produce a sequence of frequency-domain modulation symbols. Serial-to-parallel block 210 converts (i.e., de-multiplexes) the serial modulated symbols to parallel data to produce N parallel symbol streams where N is the IFFT/FFT size used in BS 102 and SS 116. Size N IFFT block 215 then performs an IFFT operation on the N parallel symbol streams to produce time-domain output signals. Parallel-to-serial block 220 converts (i.e., multiplexes) the parallel time-domain output symbols from Size N IFFT block 215 to produce a serial time-domain signal. Add cyclic prefix block 225 then inserts a cyclic prefix to the time-domain signal. Finally, up-converter 230 modulates (i.e., up-converts) the output of add cyclic prefix block 225 to RF frequency for transmission via a wireless channel. The signal may also be filtered at baseband before conversion to RF frequency.

The transmitted RF signal arrives at SS 116 after passing through the wireless channel and reverse operations to those at BS 102 are performed. Down-converter 255 down-converts the received signal to baseband frequency and remove cyclic prefix block 260 removes the cyclic prefix to produce the serial time-domain baseband signal. Serial-to-parallel block 265 converts the time-domain baseband signal to parallel time domain signals. Size N FFT block 270 then performs an FFT algorithm to produce N parallel frequency-domain signals. Parallel-to-serial block 275 converts the parallel frequency-domain signals to a sequence of modulated data symbols. Channel decoding and demodulation block 280 demodulates and then decodes the modulated symbols to recover the original input data stream.

Each of base stations 101-103 may implement a transmit path that is analogous to transmitting in the downlink to subscriber stations 111-116 and may implement a receive path that is analogous to receiving in the uplink from subscriber stations 111-116. Similarly, each one of subscriber stations 111-116 may implement a transmit path corresponding to the architecture for transmitting in the uplink to base stations 101-103 and may implement a receive path corresponding to the architecture for receiving in the downlink from base stations 101-103.

Figure 4:
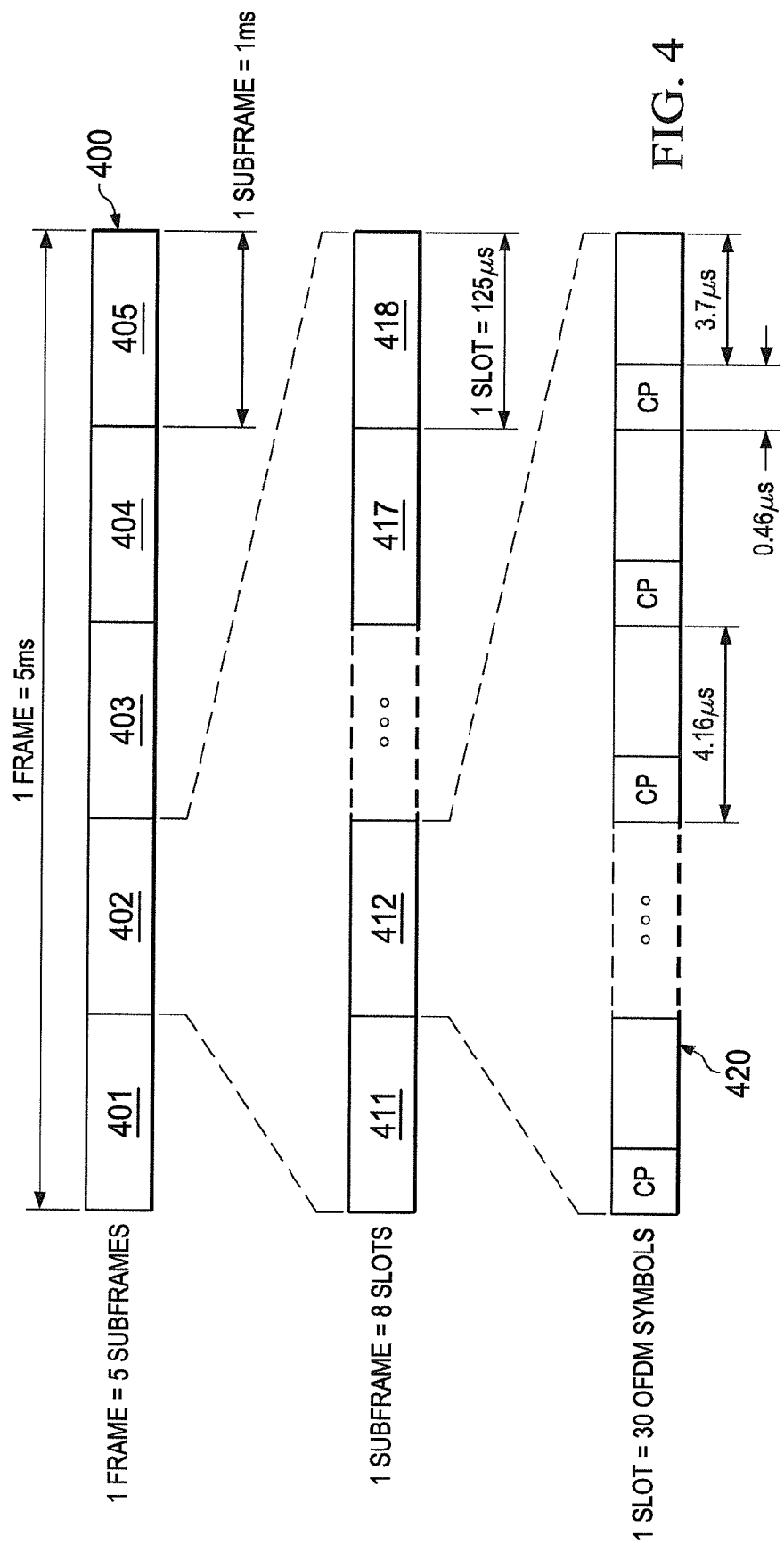
FIG. 4 illustrates a frame structure of a 5G system, according to embodiments of this disclosure.

FIG. 4 illustrates a frame structure of a 5G system, according to embodiments of this disclosure. The embodiment of the frame structure 400 illustrated in FIG. 4 is for illustration only. Other embodiments of the frame structure 400 could be used without departing from the scope of this disclosure.

As shown in FIG. 4, a frame 400 has a duration of approximately 5 ms, and includes five (5) subframes 401-405 with each subframe having a duration 1 ms. Each subframe 401-405 includes eight (8) slots 411-418 with each slot having a duration of approximately 125 µs. Each slot 411-418 includes thirty (30) OFDM/single-carrier symbols (collectively indicated by reference number 420). The duration of each symbol 420 is approximately 3.7 µs, excluding the cyclic prefix. (In other words, the OFDM subcarrier spacing is 270 kHz.) The duration of the cyclic prefix (CP) for each symbol 420 is approximately 0.46 µs (⅛ of the OFDM/single-carrier symbol duration). The bandwidth of the 5G system can be 62.5 MHz, 125 MHz, 250 MHz, 500 MHz, 1 GHz, or 2 GHz, corresponding to a Fast Fourier Transform (FFT) size of 256, 512, 1024, 2048, 4096, and 8192, respectively.

Figure 5:
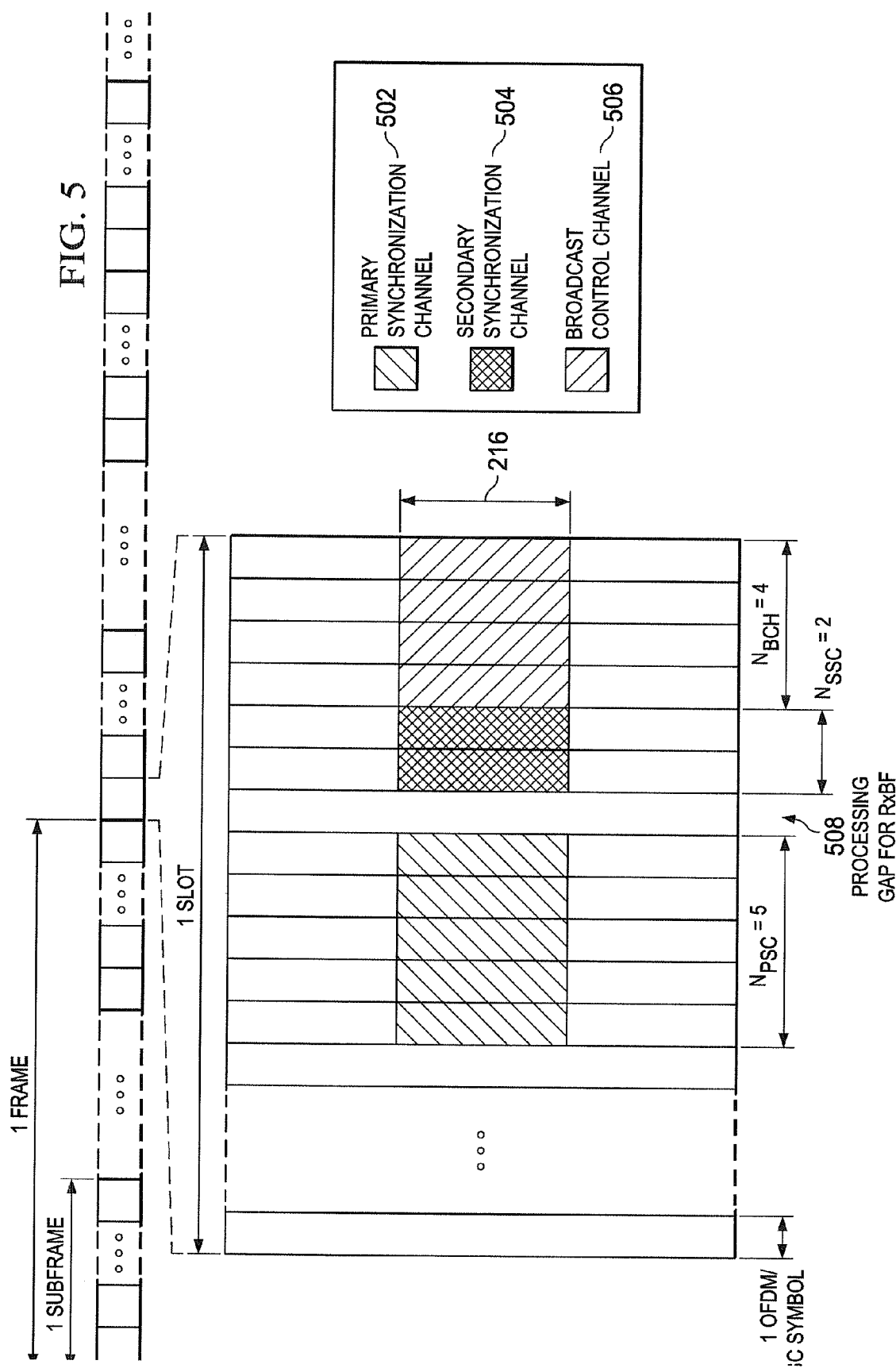
FIG. 5 illustrates a format for the synchronization signals and the broadcast control channel of a 5G system, according to embodiments of this disclosure.

FIG. 5 illustrates a format for the synchronization signals and the broadcast control channel of a 5G system, according to embodiments of this disclosure. The synchronization signals shown in FIG. 5 are for illustration only. Other embodiments could be used without departing from the scope of this disclosure. In accordance with the embodiments described below, the synchronization signals and broadcast control channel are transmitted by a transmitter (e.g., base stations 101-103) and received by a receiver (e.g., mobile stations 111-116).

As shown in FIG. 5, the synchronization signals include a primary synchronization channel (PSC) 502 and a secondary synchronization channel (SSC) 504. The PSC 502 occupies the center portion of the system bandwidth (e.g., the center 216 subcarriers as shown in FIG. 5), although the PSC 502 could occupy either the whole system bandwidth or other portions of the system bandwidth outside of the center portion of the system bandwidth. The PSC 502 spans across $N_{PSC}$ OFDM/single-carrier symbols in a slot. As shown in FIG. 5, $N_{PSC}$=5, although other values of $N_{PSC}$ are possible. More specifically, in the embodiment of FIG. 5, the PSC 502 occurs in symbols (N−12)-(N−8) in the slot, where N is the number of OFDM/single-carrier symbols in the slot, where the symbols are numbered from 0 to N−1.

The SSC 504 also occupies the center portion of the system bandwidth, although the SSC 504 could occupy either the whole system bandwidth or other portions of the system bandwidth. The SSC 504 spans across $N_{SSC}$ OFDM/single-carrier symbols. As shown in FIG. 5, $N_{SSC}$=2, although other values of $N_{SSC}$ are possible. More specifically, in the embodiment of FIG. 5, the SSC 504 occurs in symbol (N−6) and symbol (N−5) in the same slot as the PSC 502.

A gap 508 is provided between the PSC 502 and the SSC 504 to allow time for a receiver to process the PSC 502, and make any adjustment(s) if necessary, before the receiver starts to receive the SSC 504. As shown in FIG. 5, a one-symbol gap is provided at symbol (N−7).

In some embodiments, the PSC 502 and SSC 504 occur in the first slot (with duration of 125 μs) of every subframe (with duration of 1 ms).

A broadcast control channel (BCH) 506 follows the SSC 504. In the embodiment shown in FIG. 5, the BCH 506 occurs in symbols (N−4)-(N−1) in the same slot as the PSC 502. In some embodiments, the BCH 506 occurs in the first slot of every subframe.

Figure 6A:
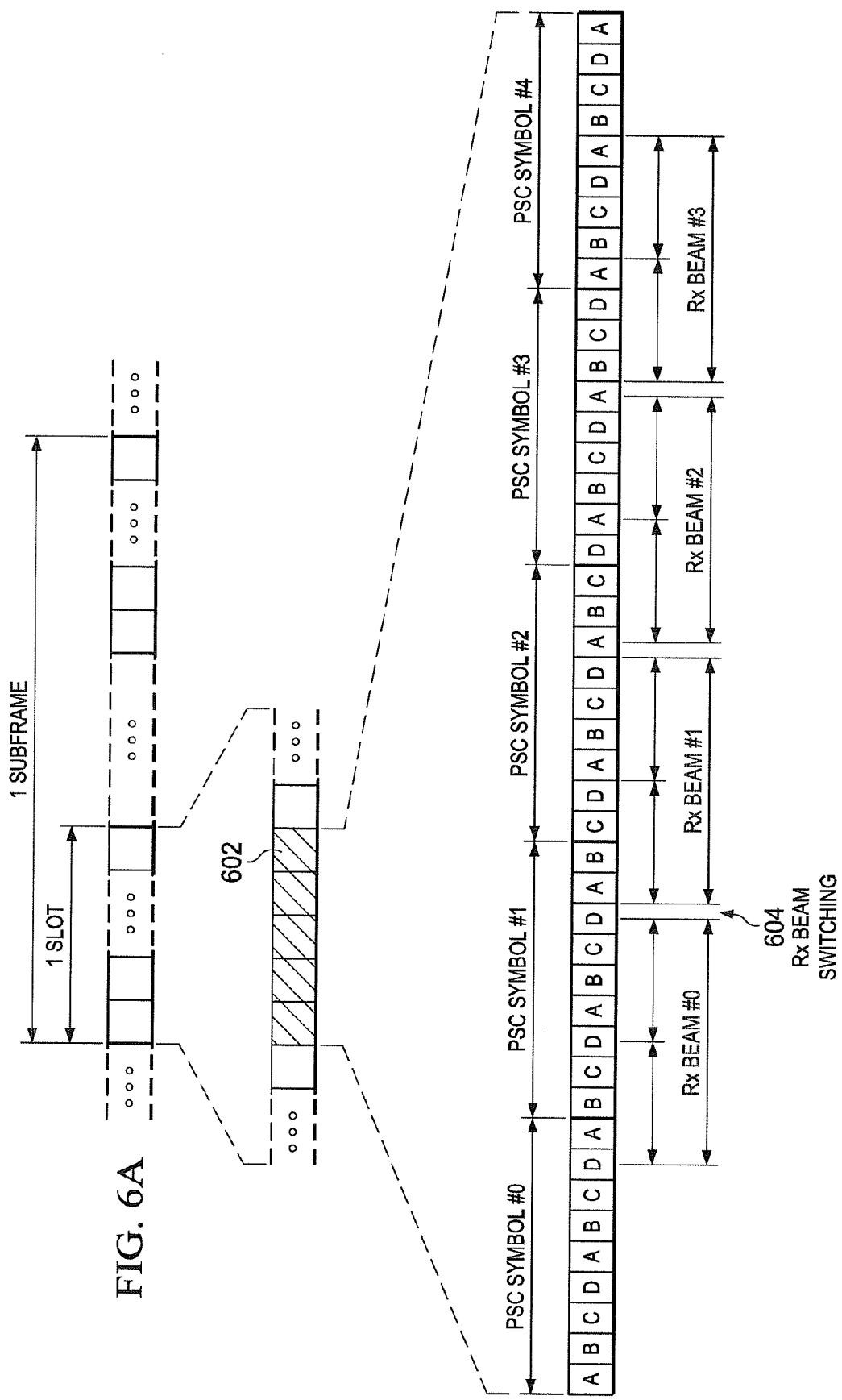
FIGS. 6A and 6B illustrate examples of a synchronization signal for a 5G system, according to embodiments of this disclosure.
Figure 6B:
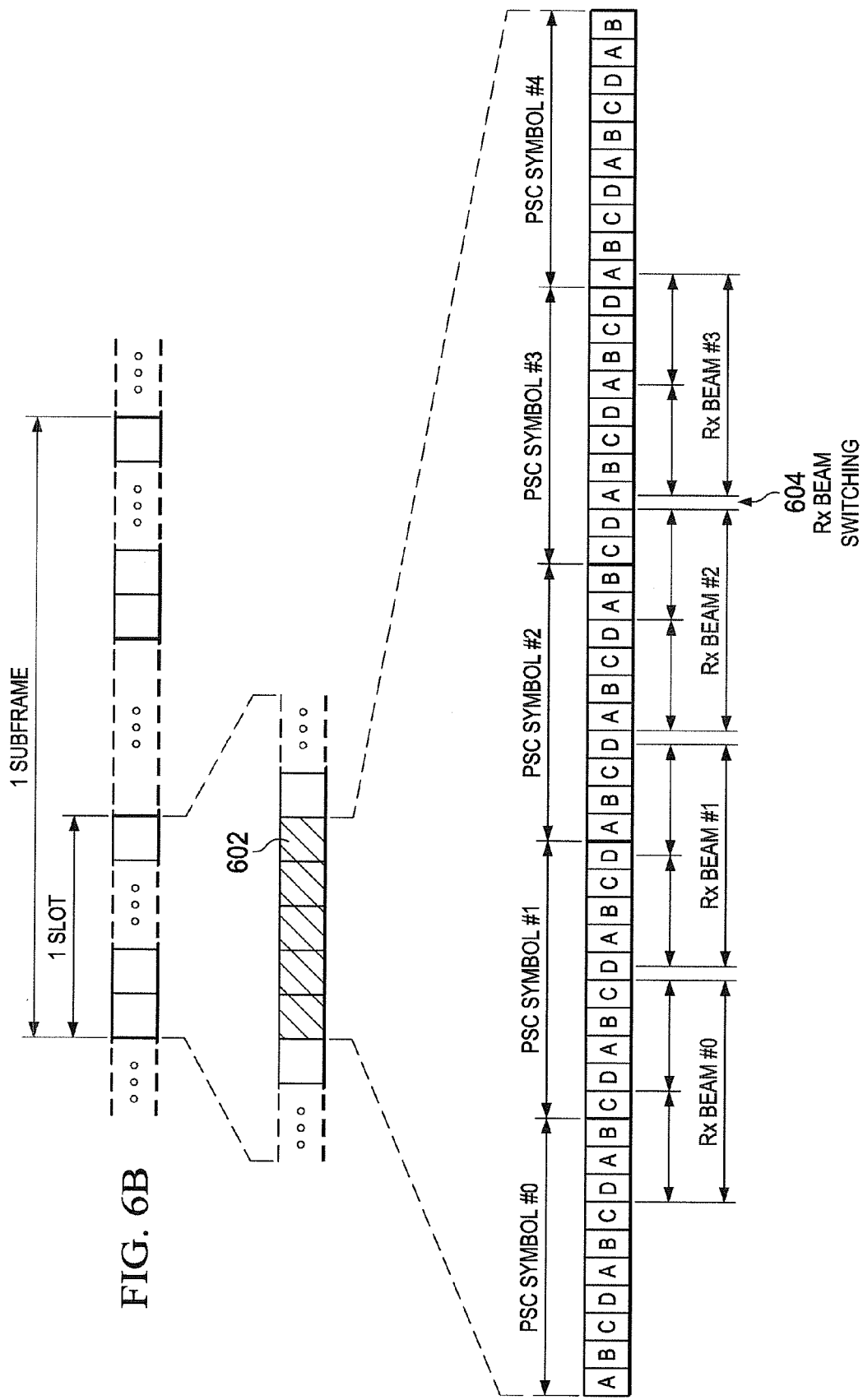

FIGS. 6A and 6B illustrate examples of a synchronization signal for a 5G system, according to embodiments of this disclosure. The synchronization signals shown in FIGS. 6A and 6B are for illustration only. Other embodiments could be used without departing from the scope of this disclosure.

As shown in FIGS. 6A and 6B, a plurality of consecutive PSC symbols 602 are generated by repeating multiple times a base sequence that is shorter than each of the PSC symbols 602. The base sequence includes four segments A, B, C, and D, with each segment having 32 samples. Thus, the base sequence includes 128 samples.

In FIG. 6A, each PSC symbol 602 has a short cyclic prefix (CP). The length of each PSC symbol 602 without the CP is 256 samples, which corresponds to eight segments A-D. The length of the CP of each PSC symbol 602 is 32 samples, which corresponds to one segment. Thus, each PSC symbol 602 in FIG. 6A has a length of 288 samples, or nine segments.

In FIG. 6A, five PSC symbols 602 are transmitted, with each symbol consisting of 288 samples. The 288 samples are further divided into nine segments, with each segment consisting of 32 samples. The PSC symbols 602 are generated by continuously repeating the base sequence [A B C D], and taking nine segments (288 samples) sequentially to form PSC Symbol #0, #1, #2, #3, and #4. As a result, PSC Symbol #0 includes the sequence [A B C D A B C D A], PSC Symbol #1 includes the sequence [B C D A B C D A B], PSC Symbol #2 includes the sequence [C D A B C D A B C], PSC Symbol #3 includes the sequence [D A B C D A B C D], and PSC Symbol #4 includes the sequence [A B C D A B C D A].

In FIG. 6B, each PSC symbol 602 has a long cyclic prefix (CP). The length of each PSC symbol 602 without the CP is 256 samples, which corresponds to eight segments A-D. The length of the CP of each PSC symbol 602 is 64 samples, which corresponds to two segments. Thus, each PSC symbol 602 in FIG. 6B has a length of 320 samples, or ten segments.

In FIG. 6B, five PSC symbols 602 are transmitted, with each symbol consisting of 320 samples. The 320 samples are further divided into ten segments, with each segment consisting of 32 samples. The PSC symbols 602 are generated by continuously repeating the base sequence [A B C D], and taking ten segments (320 samples) sequentially to form PSC Symbol #0, #1, #2, #3, and #4. As a result, PSC Symbol #0 includes the sequence [A B C D A B C D A B], PSC Symbol #1 includes the sequence [C D A B C D A B C D], PSC Symbol #2 includes the sequence [A B C D A B C D A B], PSC Symbol #3 includes the sequence [C D A B C D A B C D], and PSC Symbol #4 includes the sequence [A B C D A B C D A B].

In order to facilitate detection of CP configurations, different base sequences can be used for different CP configurations. However, in this disclosure, for simplicity of illustration, it is assumed that the same base sequence is used for short CPs and long CPs.

The PSC symbols 602 may be used for the receiver to achieve time and frequency synchronization, cell ID detection, and initial transmitter and receiver beam selection.

Assuming an OFDM waveform is used, the FFT size is preferably an integer multiple of the base sequence length. For the embodiments shown in FIGS. 6A and 6B, the FFT size can be 256 for a 128-sample base sequence. This repetition structure in time results in information that is only modulated on every other subcarrier in the frequency domain for the OFDM symbol. The remaining subcarriers may be turned off (i.e., there is no power or signal transmitted on those subcarriers). This structure facilitates frequency synchronization because the frequency offset between the transmitter and the receiver manifests as a phase rotation between the two repetitions of the same base sequence, which can be easily detected by computing the cross correlation between the received signals of the two repetitions.

By detecting the peak of the cross correlation, the receiver can also detect the location of the PSC. With the prior knowledge of the timing of PSC within a slot and a frame, the receiver can acquire information about the slot and frame timing. However, in certain embodiments, it may not be straightforward to resolve the OFDM symbol timing because there may be multiple peaks due to the repetition structure of the PSC symbols.

Multiple base sequences can be used to carry some cell identification information. For example, three or six different base sequences can be used to indicate a first portion of the cell identification information, herein referred to as $N_{cell-ID-1}$.

The receiver can also determine a preferred receiver beam using the PSC symbols 602. One example is shown in FIG. 6A.

For a given receiver beam #x, x=0, 1, 2, ..., the receiver can perform PSC detection for beam #x by forming a receiver beam #x, and receiving at least 256 samples of the transmitted signal with the receiver beam. The receiver divides the 256 samples into the first 128 samples and the second 128 samples. The receiver then computes the cross correlation between the first 128 samples and the second 128 samples. The absolute value (or other measure) of the cross correlation can be used as a PSC detection metric.

Although FIGS. 6A and 6B illustrate two examples of a synchronization signal for a 5G system, various changes may be made to FIGS. 6A and 6B. For example, while FIGS. 6A and 6B each show four receiver beams (Rx beam #0 through Rx beam #3), the receiver may operate with more or fewer receiver beams. Also, while FIGS. 6A and 6B show the transmitter transmitting five contiguous PSC symbols, the transmitter may transmit more or fewer contiguous PSC symbols.

Figure 7:
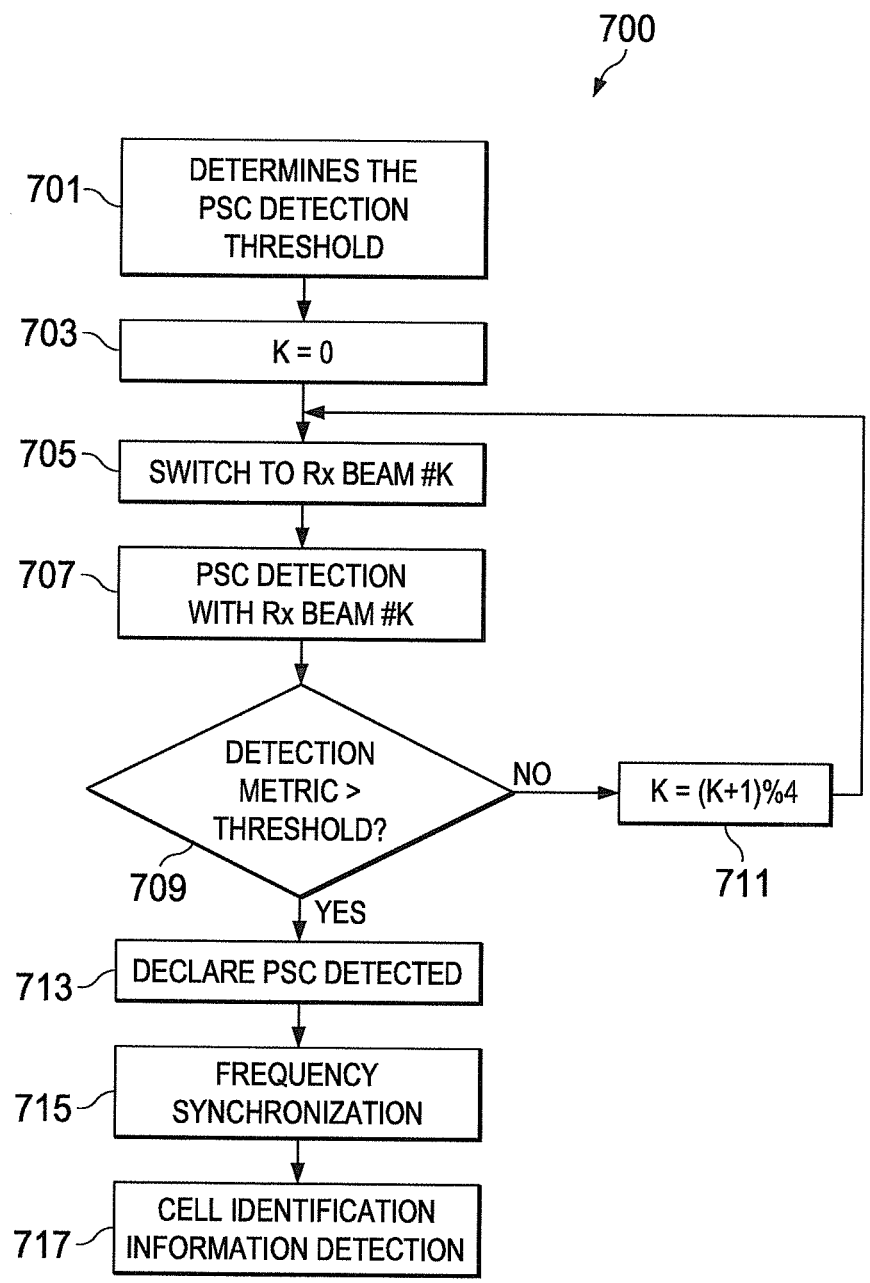
FIG. 7 illustrates a method for primary synchronization channel (PSC) detection with receiver beamforming according to an embodiment of this disclosure.

FIG. 7 illustrates a method for PSC detection with receiver beamforming according to an embodiment of this disclosure. The detection with receiver beamforming method shown in FIG. 7 is for illustration only. Other embodiments could be used without departing from the scope of this disclosure. The receiver algorithm 700 for receiver beam selection (and synchronization, cell ID detection) is as follows.

In block 701, the receiver determines the threshold for PSC detection. For example, the threshold can be determined based on the received signal strength.

In block 703, a counter K is set to zero. The counter K represents the number of the receiver beam. In block 705, the receiver switches to the receiver beam #K. Then, in block 707, the receiver performs PSC detection for the receiver beam #K.

In block 709, the PSC detection metric is compared to the PSC detection threshold. If the PSC detection metric is greater than the PSC detection threshold, the method moves to block 713. Alternatively, if the PSC detection metric is less than the PSC detection threshold, the method moves to block 711, and K is increased by 1. The operation then moves back to block 705.

Returning to block 705, the receiver switches to receiver beam #1 and performs PSC detection for receiver beam #1. Note that the receiver beam switching takes some time and thus may create a gap (as indicated by reference number 604 in FIGS. 6A and 6B) between the received signal for different receiver beams. Blocks 705-711 are repeated for additional receiver beams (e.g., Rx Beam #2 and Rx Beam #3 in FIGS. 6A and 6B) until the PSC detection metric is greater than the PSC detection threshold.

Returning to block 709, if the PSC detection metric is greater than the PSC detection threshold, then the receiver has detected the PSC, as indicated at block 713. In some embodiments, before the declaration, the receiver may double check to reduce the probability of a PSC detection false alarm. For example, (possibly after frequency synchronization), the receiver can detect whether the correlation peak indeed corresponds to a valid PSC sequence.

In block 715, based on the phase of the cross correlation, the receiver may estimate the phase rotation across 128 samples and thus derive the frequency offset. The receiver can then compensate the frequency offset and achieve frequency synchronization. The sequences can also be properly chosen such that other methods of frequency synchronization can be used.

In block 717, with the frequency offset compensated, the receiver may attempt detection of the sequence carried in the PSC. If the PSC sequences are mapped to cell ID information (e.g., $N_{cell\text{-}ID\text{-}1}$), the cell ID information can therefore be detected.

Although FIG. 7 illustrates one example of a method 700 for PSC detection, various changes may be made to FIG. 7. For example, various blocks in FIG. 7 may overlap, occur in parallel, occur in a different order, or occur multiple times. As another example, instead of comparing the PSC detection metric of each Rx beam to the PSC detection threshold, the receiver could wait until the PSC detection procedure is completed for all four beams, and then select the highest PSC detection metric among the four receiver beams to compare with the PSC detection threshold. The receiver can combine the received signals, or PSC detection metrics, from multiple receiver beams to improve detection performance. Since the receiver may attempt frequency synchronization, cell ID detection, and receiver beam-forming all in one operation, the receiver may also further optimize the detection to jointly detect these pieces of information. The PSC sequences can also be carefully chosen to facilitate this kind of optimization to improve the PSC detection performance.

Moreover, while in embodiments shown in FIGS. 6A, 6B, and 7, the receiver selects the preferred receiver beam among four receiver beams, it is possible that the receiver may select the preferred receiver beam among fewer or more receiver beams. It is noted that by transmitting five contiguous PSC symbols generated from repetition of a base sequence, it is ensured that within the time span of the five PSC symbols, a full base sequence (or a cyclic shifted version of the base sequence) can be received for each of the four receiver beams regardless of the receiver beam switching timing. Of course, the receiver beam switching time (shown as gaps between receiver beams in FIGS. 6A and 6B) should not be too long. In the embodiments shown in FIGS. 6A and 6B, the receiver beam switching time can be as long as $5 \times 32/3 \approx 53$ samples in order to ensure that within the time span of the five PSC symbols, a full base sequence (or a cyclic shifted version of the base sequence) can be received for each of the four receiver beams regardless of the receiver beam switching timing.

After the receiver beam selection, the receiver may report the preferred receiver beam to the transmitter via a feedback channel. The feedback channel can be a random access preamble, a random access report, or a channel state information feedback report.

Embodiments of this disclosure also support transmitter beamforming. In one embodiment, the transmitter uses a first transmitter beam to transmit a first set of PSC symbols and uses a second transmitter beam to transmit a second set of PSC symbols. The first set of PSC symbols and the second set of PSC symbols can be either in the same slot or in different slots.

In another embodiment, the transmitter uses a first transmitter beam to transmit a first set of PSC symbols in a first slot and uses a second transmitter beam to transmit a second set of PSC symbols in a second slot. For example, the transmitter uses a different transmitter beam for PSC symbols in each of the five subframes of a frame. The mapping from transmitter beam ID to subframe ID can be deterministic or derived from the cell ID. By doing so, the receiver can identify the transmitter beam ID based on the subframe timing.

In an embodiment, the transmitter may transmit a first PSC sequence in the first set of PSC symbols and a second PSC sequence in the second set of PSC symbols. The first PSC sequence can be mapped to a first transmitter beam and the second PSC sequence can be mapped to a second transmitter beam. This can help the receiver detect which transmitter beam it is receiving.

After the transmitter beam selection, the receiver may report the preferred transmitter beam to the transmitter via a feedback channel. The feedback channel can be a random access preamble, a random access report, or a channel state information feedback report.

After PSC detection, the receiver can acquire frequency synchronization, achieve a certain level of transmitter and receiver beamforming, and detect cell ID information carried in the PSC. A gap may be introduced between the PSC symbols and the SSC symbols (e.g., processing gap 508) to allow time for the receiver to process the PSC detection, and to switch to the preferred receiver beam for SSC detection.

If transmitter beamforming is used, the same transmitter beam for the PSC symbols may be used for the SSC symbols in the same slot. In an alternative embodiment, the PSC symbols and the SSC symbols in the same subframe can be located in different but consecutive slots. In such an embodiment, the same transmitter beam for the PSC symbols may be used for the SSC symbols in the same subframe.

If receiver beamforming is used, the preferred receiver beam acquired in PSC detection stage should be used for SSC detection. Either transmitter beamforming, or receiver beamforming, or both can significantly improve the signal quality and performance of SSC and BCH detection.

The Secondary Synchronization Channel (SSC) carries part of the cell ID information, $N_{cell\text{-}ID\text{-}2}$. The SSC can also be used to further refine the frequency synchronization, detect the CP configuration, and detect OFDM/SC symbol timing, slot timing, and subframe timing.

The SSC consists of two SSC symbols (as shown in FIG. 4). In one embodiment, the length of the SSC sequence is 256 samples. For a short CP configuration, the CP length is 32 samples. For a long CP configuration, the CP length is 64 samples. The two SSC symbols may repeat the same SSC sequence. This allows simple methods (e.g., a sliding correlator) to detect the OFDM/SC symbol timing, slot timing, and subframe timing. The CP duration can also be detected by comparing the peak cross correlation values with two different CP configuration hypotheses.

For example, FIGS. 8A through 8D illustrates detection of the CP configuration and symbol timing using SSC symbols, according to an embodiment of this disclosure. The sliding correlator calculates the inner product of two 256-sample sequences that are separated by a delay equal to either the symbol length plus a short CP (256 samples+32 samples=288 samples) or the symbol length plus a long CP (256 samples+64 samples=320 samples). In FIGS. 8A and 8B, the SSC includes a short CP, such as shown in FIG. 6A. In FIGS. 8C and 8D, the SSC includes a long CP, such as shown in FIG. 6B.

FIGS. 8A and 8C illustrate a sliding window with the delay equal to the symbol length plus the short CP, while FIGS. 8B and 8D illustrate a sliding window with the delay equal to the symbol length plus the long CP. A peak is detected when the SSC is present and the delay matches with the CP configuration. For example, in FIG. 8A, a peak is detected because the delay equal to the symbol length plus short CP matches the SSC with short CP. Likewise, in FIG. 8D, a peak is detected because the delay equal to the symbol length plus long CP matches the SSC with long CP. In contrast, no peak is detected in FIGS. 8B and 8C because the delay does not match the CP configuration (i.e., long CP/short CP or short CP/long CP).

Based on the peak detection, the CP configuration and the symbol timing can be detected. Because the location of SSC symbols are fixed (e.g., in certain symbols of the first slot in every subframe), the slot timing and subframe timing can also be derived.

The residual frequency offset after frequency synchronization using the PSC symbols can be estimated during SSC detection. For example, the residual frequency offset can be estimated via the phase rotation between the first SSC symbol and the second SSC symbol and thus be compensated.

Part of the cell ID information, $N_{cell\text{-}ID\text{-}2}$, can be encoded in the SSC sequences. After detecting the SSC symbols, the receiver can detect the SSC sequence ID, and thus determine $N_{cell\text{-}ID\text{-}2}$, which is carried on the SSC symbols. The cell ID of a base station, $N_{cell\text{-}ID}$, can then be derived from the cell ID information encoded in the PSC, $N_{cell\text{-}ID\text{-}1}$, and the cell ID information encoded in the SSC, $N_{cell\text{-}ID\text{-}2}$. In order to mitigate SSC collision among neighboring cells, the choice of SSC sequence for a cell may depend on both $N_{cell\text{-}ID\text{-}1}$ and $N_{cell\text{-}ID\text{-}2}$.

In accordance with certain embodiments, after PSC and SSC detection, the receiver attempts BCH detection. In one embodiment, such as shown in FIG. 5, the BCH is transmitted immediately following the SSC symbols.

If transmitter beamforming is used, the same transmitter beam(s) as those used for transmitting the PSC and SSC symbols may be used to transmit the BCH that immediately follows the PSC and SSC symbols. In the embodiment shown in FIG. 5, the same transmitter beam is used to transmit the PSC, SSC, and BCH in the same slot.

If receiver beamforming is used, the preferred receiver beam acquired during the PSC detection stage may be used to receive the BCH that immediately follows those PSC symbols. In the embodiment shown in FIG. 5, the preferred receiver beam acquired during the PSC detection stage may be used to receive the BCH that is transmitted in the same slot as the PSC symbols. Also in receiver beamforming, the same receiver beam used for SSC detection may be used to receive the BCH that immediately follows those SSC symbols. In the embodiment shown in FIG. 5, the same receiver beam used for the SSC may be used to receive the BCH that is transmitted in the same slot as the SSC. By doing so, the SSC symbols can be used as reference signals for the BCH, enabling coherent detection of the BCH.

Figure 9:
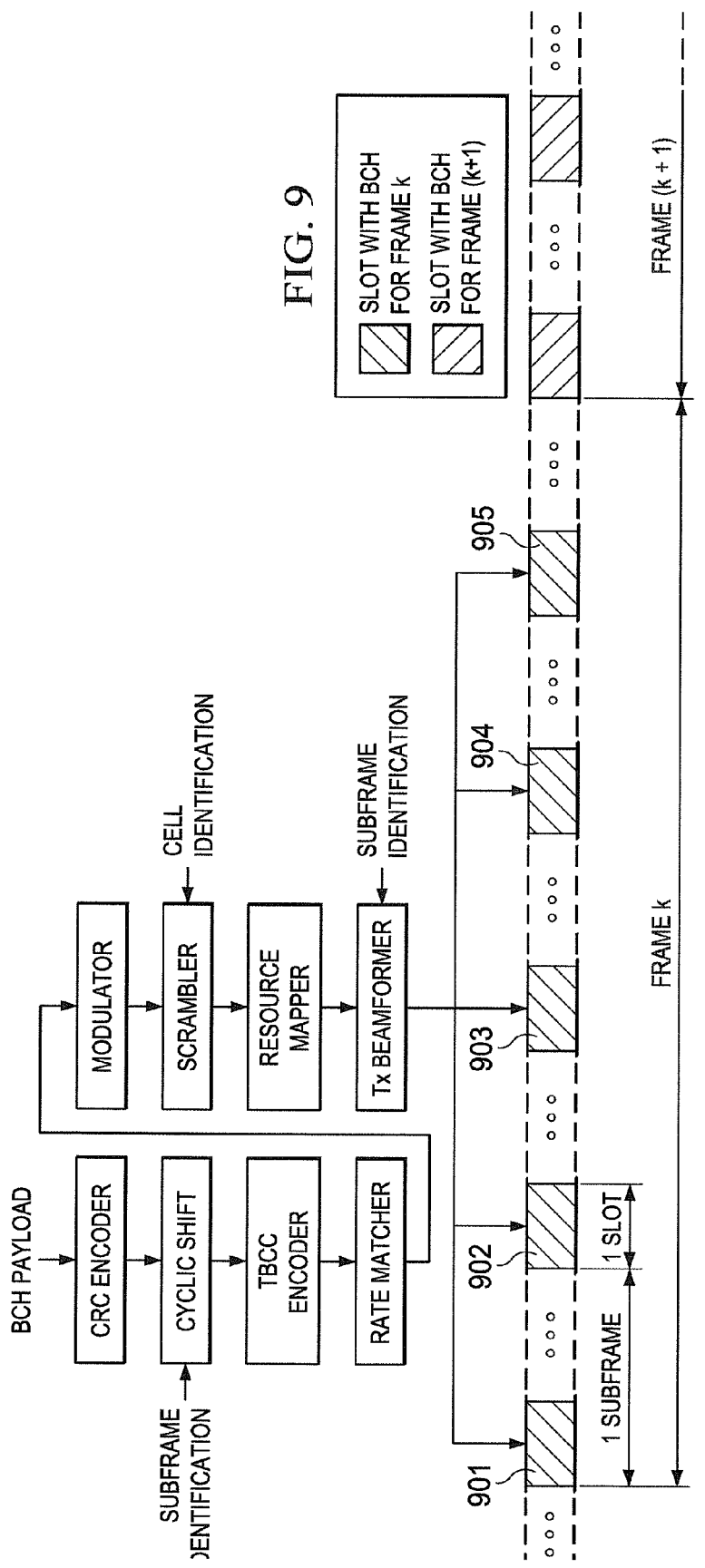
FIG. 9 illustrates an example of subframe ID and transmitter beam ID detection using a broadcast control channel (BCH), according to an embodiment of this disclosure.

FIG. 9 illustrates an example of subframe ID and transmitter beam ID detection using the BCH, according to an embodiment of this disclosure. The embodiment of the subframe ID and transmitter beam ID detection using the BCH shown in FIG. 9 is for illustration only. Other embodiments could be used without departing from the scope of this disclosure.

As shown in FIG. 9, the same BCH message is transmitted in each subframe of a frame, as indicated by reference numbers 901-905. However, the encoding of the same BCH message can be different in different subframes of the same frame. As a result, the subframe ID can be implicitly detected. In an embodiment, a cell-specific scrambling may be applied to the BCH signal after the TBCC (tail biting convolutional code) encoder, after the rate matcher, after the modulator, or after the resource mapper, to randomize the BCH signal. In FIG. 9, the cell-specific scrambling is applied after the modulator. Since the receiver can detect the cell ID from the PSC and SSC, the receiver can correctly descramble the BCH signal if the cell ID is correctly detected.

For the BCH transmission in a subframe, the CRC (cyclic redundancy check) encoder output of the BCH may be cyclically shifted according to the subframe ID before the TBCC encoding. Correspondingly, after the TBCC decoding at the receiver, the receiver can detect the subframe ID (i.e., frame timing) by attempting CRC decoding with different cyclically shifted versions of the decoded message. In an embodiment, only the correct subframe ID hypothesis leads to the correct CRC check. Thus, the subframe ID (i.e., frame timing) is implicitly signaled, reducing the BCH overhead. Moreover, by keeping the BCH payload the same within a frame, the received BCH symbols can be combined across multiple subframes in the same frame, increasing BCH detection performance.

If a mapping is also established between the subframe ID and the transmitter beam ID, the transmitter beam ID can also be detected once the subframe ID is detected. By doing so, the transmitter beam ID is implicitly signaled, reducing the BCH overhead. Moreover, by keeping the BCH payload the same within a frame, the received BCH symbols can be combined across multiple subframes in the same frame, increasing the BCH detection performance.

Alternatively, the BCH transmission in different subframes can be scrambled by different sequences, which can be generated by the same sequence generator with different initialization values, or different portions of the same sequence. The receiver can detect the subframe ID by attempting decoding of the BCH transmission assuming different scrambling sequences, and by performing a CRC check on the decoding outcomes.

Likewise, the BCH transmission using different transmitter beams can be scrambled by different sequences, which can be generated by the same sequence generator with different initialization values, or different portions of the same sequence. The receiver can detect the transmitter beam ID by attempting decoding of the BCH transmission assuming different scrambling sequences, and by performing a CRC check on the decoding outcomes.

FIG. 10 illustrates another format for transmitting synchronization signals and system information in a 5G system, according to embodiments of this disclosure. FIG. 10 includes a number of features that are the same as or similar to the format shown in FIG. 5. A detailed explanation of those features will not be repeated here.

As shown in FIG. 10, a number of OFDM/single-carrier symbols are used for synchronization signal and system information broadcast. For example, a PSC/SSC/BCH resource set (such as the resource sets indicated at reference numbers 1002-1008) includes one symbol for the primary synchronization channel ($N_{PSC}=1$), one symbol for the secondary synchronization channel ($N_{SSC}=1$), and one symbol for the broadcast control channel ($N_{BCH}=1$). Within each symbol, a certain bandwidth (e.g., 216 subcarriers as shown in FIG. 10) is used by these channels. In some embodiments, these symbols are contiguous, although it is possible that some of the symbols may be separated by one or more other symbols due to design considerations (e.g., to avoid collision with other control channels or signals). Also, for the purpose of illustration, in FIG. 10, the symbols within each PSC/SSC/BCH resource set 1002-1008 are in the same slot, although it is possible that the symbols could occupy two adjacent slots. Other configurations of the PSC/SSC/BCH resource sets and other values for $N_{PSC}$, $N_{SSC}$, and $N_{BCH}$ are possible.

The transmitter may use multiple PSC/SSC/BCH resource sets within a slot to deliver the synchronization signals and system information. For example, in FIG. 7, four PSC/SSC/BCH sets 1002-1008 within a slot are shown. The PSC/SSC/BCH resource sets 1002-1008 are preferably contiguous, although it is possible that the resource sets could be separated by one or more symbols due to design considerations (e.g., to avoid collision with other control channels or signals). The PSC/SSC/BCH resource sets 1002-1008 are placed in different OFDM/single-carrier symbols, although it is possible that the PSC/SSC/BCH resource sets 1002-1008 could be placed in the same OFDM/single-carrier symbols but in different frequencies.

In some embodiments, the transmitter can apply different transmitter beamforming in different PSC/SSC/BCH resource sets. In an embodiment, the same transmitter beamforming is preferably applied within a PSC/SSC/BCH resource set.

In the format shown in FIG. 10, twelve symbols are used for transmission of the four PSC/SSC/BCH resource sets 1002-1008 in a slot (125 µs). If the transmitter repeats the transmission of the four PSC/SSC/BCH resource sets every subframe (1 ms), the overhead of synchronization and system information broadcast is approximately $12/(30\times8)=5\%$, assuming a frame structure with 30 symbols per slot (such as the frame structure shown in FIG. 4) for a system with a small bandwidth (equivalent of 216 subcarriers, as shown in FIG. 10).

The format shown in FIG. 10 allows the receiver to acquire the synchronization and system information within one subframe (1 ms).

The receiver may also apply receiver beamforming in synchronization and system information acquisition. Preferably, different receiver beamforming can be applied in different slots in which the PSC/SSC/BCH are transmitted while the same receiver beamforming is used for the PSC/SSC/BCH within the same slot. By doing so, the PSC/SSC, once detected, can be used to facilitate the reception of the BCH within the same resource set or slot.

Figure 11A:
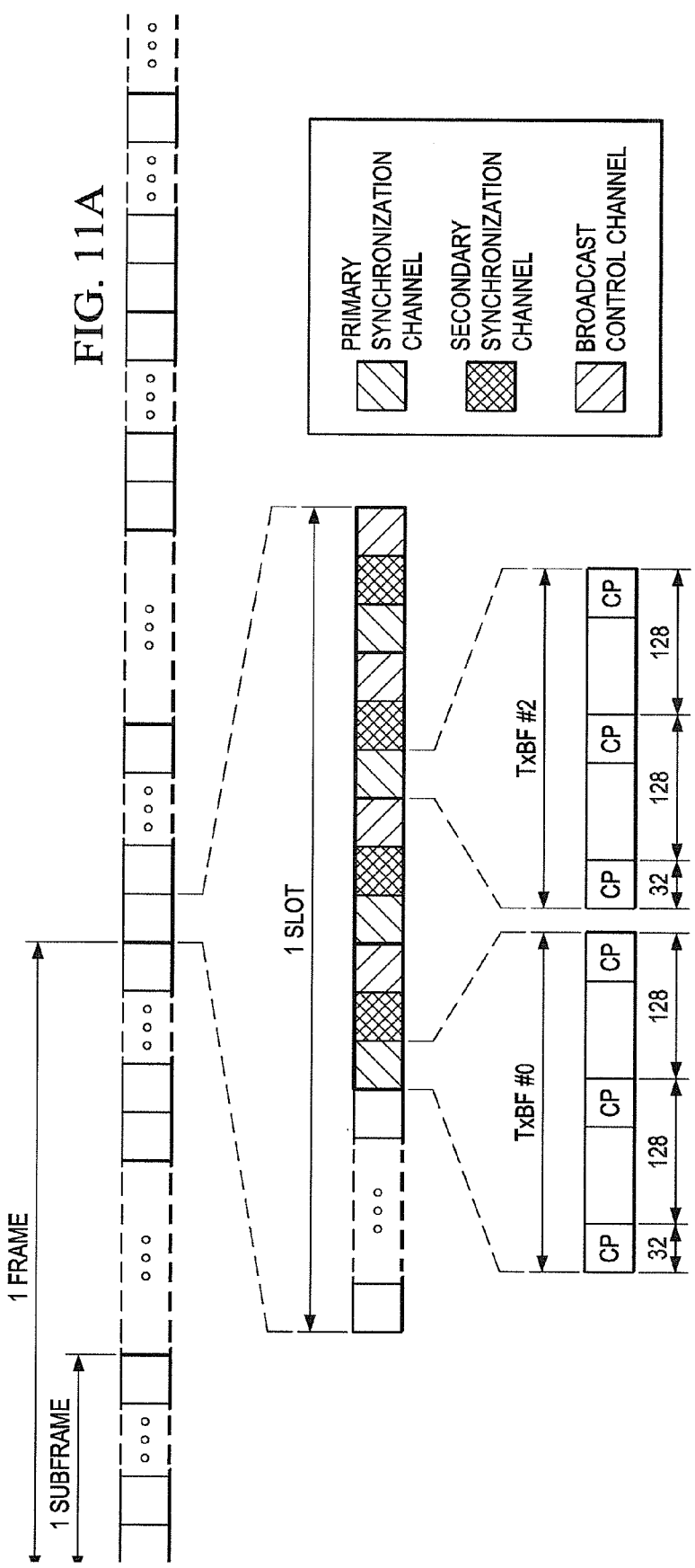
FIGS. 11A and 11B illustrate examples of the PSC, according to embodiments of this disclosure.
Figure 11B:
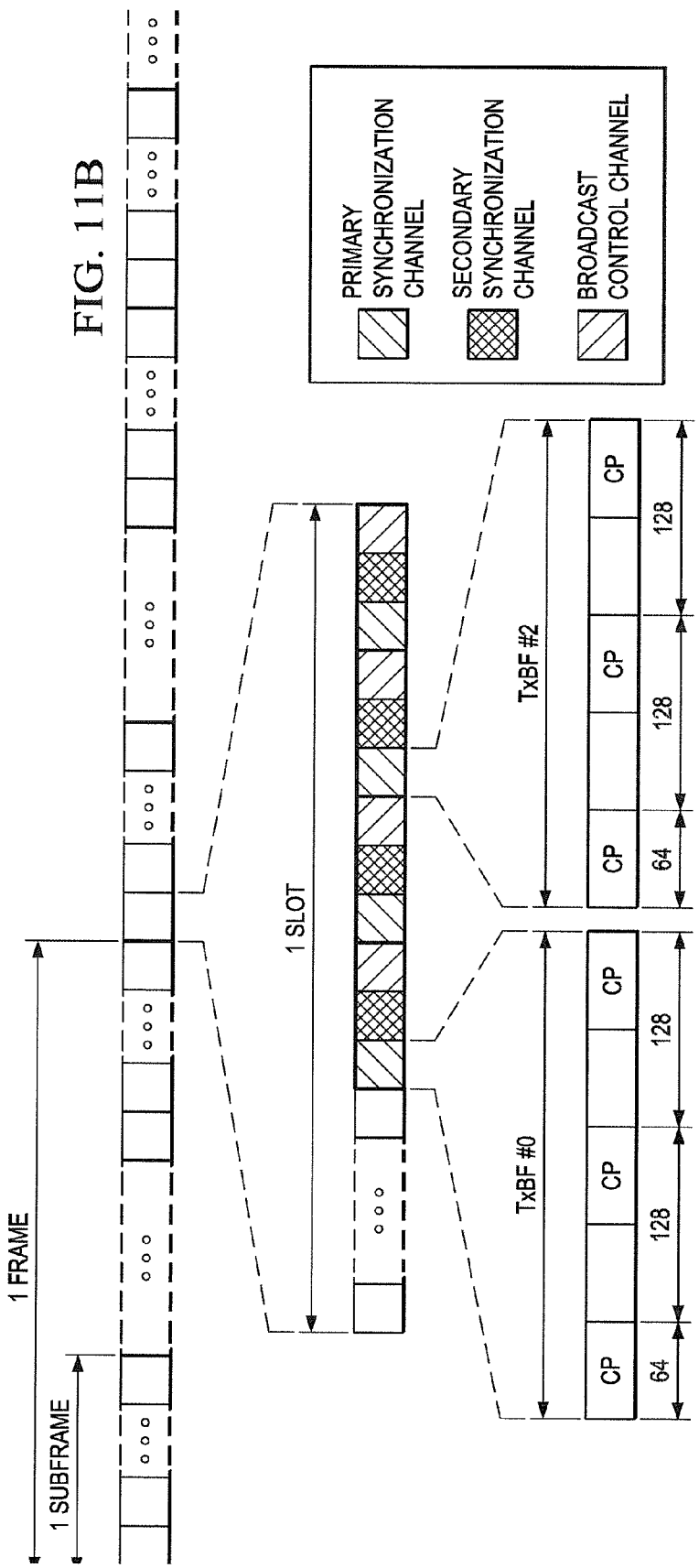

FIGS. 11A and 11B illustrate examples of the primary synchronization channel (PSC), secondary synchronization channel (SSC), and broadcast control channel (BCH), according to embodiments of this disclosure. FIG. 11A illustrates a frame structure that includes short CPs, while FIG. 11B illustrates a frame structure that includes long CPs. A time domain repetition structure is introduced in the PSC symbols. Since the PSC symbols exhibit the structure of an OFDM symbol, this time domain repetition structure can be equivalently achieved by nulling out every other subcarrier in the frequency domain. In the examples shown in FIGS. 11A and 11B, the PSC sequence length in time-domain is 128, with one repetition to achieve 256 samples of an OFDM symbol, assuming a 256-point IFFT is used to generate the OFDM symbol. Note that a constant phase offset (180 degree) may be introduced between the two repetitions, if the even-numbered subcarriers, including DC subcarrier, are nulled out. The PSC can also be used to carry a portion of the cell ID information, e.g., $N_{cell-ID-1}$. For example, a different PSC sequence can be used for a different value of $N_{cell-ID-1}$. Preferably, the PSC sequences should have good properties such as low auto-correlation and cross-correlation value to minimize the false detection.

The receiver may use a sliding correlator or multiple sliding correlators (e.g., one correlator for each PSC sequence) to detect the PSC symbol. The frequency offset between the transmitter and the receiver can be detected from the phase rotation between the two time-domain repetitions in the same PSC symbol and can therefore be compensated. The receiver may also detect the CP configuration using a similar method as described in FIGS. 8A through 8D.

Upon successful detection of the PSC, the receiver should be able to acquire frequency synchronization, CP configuration, OFDM/single-carrier symbol timing, and a portion of the cell ID information, e.g., $N_{cell-ID-1}$. The SSC can carry another portion of the cell ID information, e.g., $N_{cell-ID-2}$.

If transmitter beamforming is used, the same transmitter beamforming for the PSC should be used for the SSC transmission in the same PSC/SSC/BCH resource set. Likewise, if receiver beamforming is used, the same receiver beamforming for the PSC should be used for the SSC reception in the same PSC/SSC/BCH resource set.

Upon successful detection of the SSC, the receiver should be able to acquire the cell ID. In other words, the receiver should be able to uniquely determine the cell ID based on the portion of cell ID information carried in the PSC, $N_{cell-ID-1}$, and the portion of cell ID information carried in the SSC, $N_{cell-ID-2}$. A simple relationship such as $N_{cell-ID}=N_{cell-ID-1} \times K+N_{cell-ID-2}$, or $N_{cell-ID}=N_{cell-ID-2}\times L+N_{cell-ID-1}$ may be used, where K and L are constants that depend on the number of cell IDs in the system.

A cell-specific scrambling may be additionally applied to the BCH signal to randomize the BCH signal among neighboring cells. Since the receiver can detect the cell ID from the PSC and SSC, the receiver can correctly descramble the BCH signal if the cell ID is correctly detected.

The BCH may carry system information such as the transmitter antenna array configuration, transmitter beamforming configuration, system bandwidth configuration, and the like. In addition, a BCH transmission may also carry subframe timing (e.g., subframe ID), frame timing (e.g., frame ID), and information regarding the transmitter beamforming (e.g., transmitter beam ID) for the current BCH transmission. The subframe ID, frame ID, or transmitter beam ID may be explicitly signaled in the BCH message (e.g., the payload of the BCH).

Figure 12:
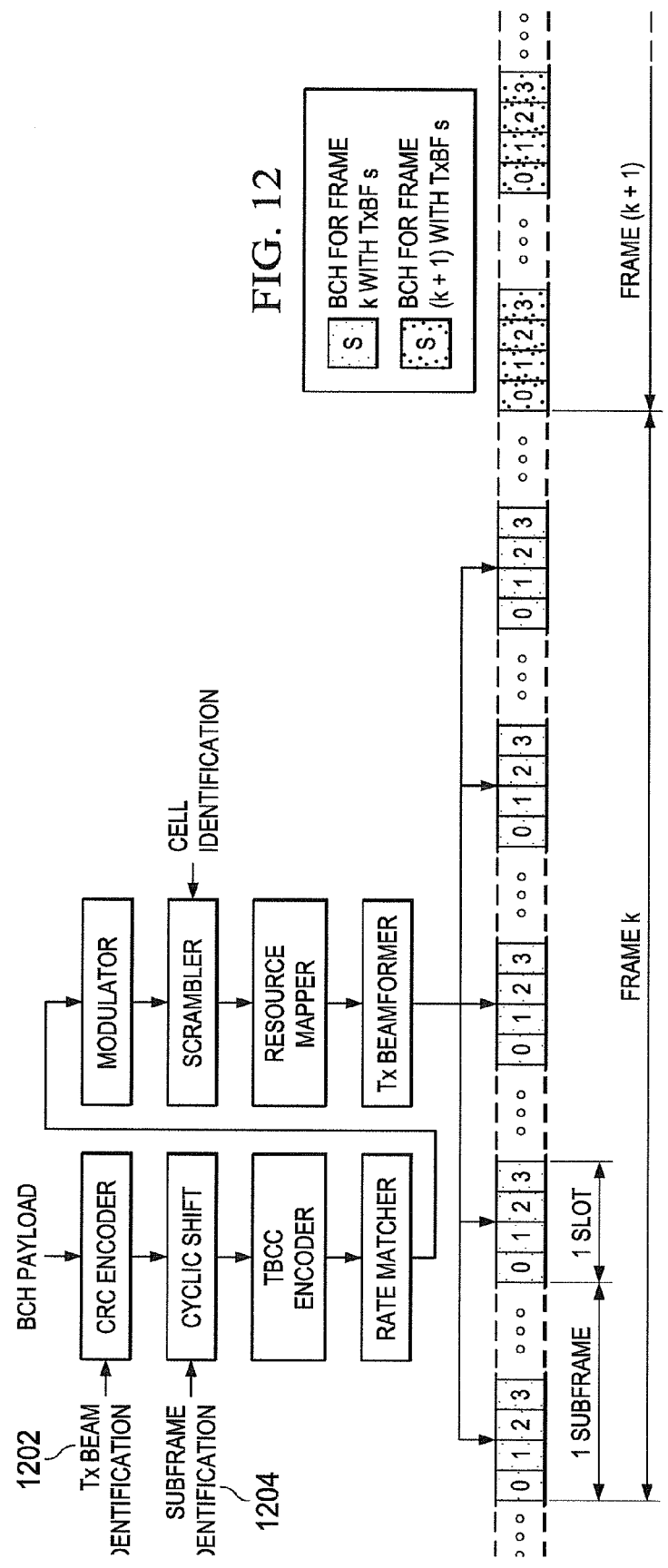
FIG. 12 illustrates an example of BCH transmission, according to an embodiment of this disclosure.

In another embodiment, the subframe ID, frame ID, or transmitter beam ID can be signaled implicitly using CRC masks or cyclic shifts of the CRC encoded message. One example of such implicit signaling is shown in FIG. 12. In FIG. 12, the BCH (together with the PSC and SSC) is transmitted using transmitter beams 0, 1, 2, and 3 in the first slot of every subframe.

A receiver may be able to receive the BCH from one or more transmitter beams. In order for the receiver to distinguish the transmitter beam used in a BCH transmission, the transmitter may provide a different CRC mask for each transmitter beam ID, as indicated by reference number 1202 in FIG. 12. The receiver can then detect the transmitter beam ID by performing CRC check and comparing the CRC checksum with the CRC masks of all possible transmitter beam IDs.

The slot timing (i.e., the slot boundary) can also be detected by establishing a mapping between the CRC mask (or transmitter beam ID) and the OFDM symbols used for a BCH transmission. For example, as shown in FIG. 10, the transmitter may use transmitter beam #0 in symbol 18-20, use transmitter beam #1 in symbol 21-23, use transmitter beam #2 in symbol 24-26, and use transmitter beam #3 in symbol 27-29. The BCH transmission in symbol 20 contains a CRC masked by a first CRC mask, the BCH transmission in symbol 23 contains a CRC masked by a second CRC mask, the BCH transmission in symbol 26 contains a CRC masked by a third CRC mask, and the BCH transmission in symbol 29 contains a CRC masked by a fourth CRC mask. Assuming the PSC/SSC/BCH are only transmitted in the first slot of a subframe, the subframe timing (i.e., the subframe boundary) can also be determined from the slot timing.

By performing the CRC check and detecting the CRC mask value, the receiver is able to identify the symbol ID of the BCH transmission in that symbol that the receiver is able to correctly receive. Therefore, the receiver can determine the slot timing (i.e., slot boundary) from the symbol ID. Similarly, the transmitter beam ID of the BCH transmission that the receiver is able to correctly receive can also be identified via the mapping between the transmitter beam ID and the CRC mask. In some embodiments, the receiver may be able to correctly detect the BCH transmission from multiple transmitter beams in multiple OFDM symbols. In such embodiments, the slot timing and the transmitter beam IDs can also be identified.

In another embodiment, the transmitter may cyclically shift the CRC encoded BCH message according to the transmitter beam ID. In such an embodiment, the receiver can detect the transmitter beam ID by performing the CRC check with multiple hypotheses of the cyclic shift value. Moreover, the receiver can combine received modulation symbols of the BCH from multiple transmitter beams (possibly in multiple OFDM symbols) to improve the reliability of the BCH detection. A procedure to efficiently combine the received symbols of the same message with different cyclic shifts is detailed in REF8.

In order for the receiver to detect the frame timing (i.e., frame boundary), the transmitter may embed the subframe ID information implicitly in BCH transmissions. The receiver can easily derive the frame timing (frame boundary) based on the slot timing (slot boundary), subframe timing (subframe boundary), or the subframe ID of the current BCH transmission. In the embodiment shown in FIG. 12, the transmitter cyclically shifts the CRC encoded BCH message according to the subframe ID, as indicated by reference number 1204. The receiver can detect the subframe ID by performing the CRC check with multiple hypotheses of the subframe ID. Moreover, the receiver can combine received modulation symbols of BCH from multiple subframes within the same frame to improve the reliability of the BCH detection.

In another embodiment, the transmitter may apply a different CRC mask for each subframe ID. In such an embodiment, the receiver can detect the subframe ID by performing the CRC check and comparing the CRC checksum with the CRC masks of all possible subframe IDs.

As described above, upon successful detection of the BCH, the receiver can determine the slot timing (the slot boundary), subframe timing (subframe boundary), and frame timing (frame boundary). If frame ID information is carried in the BCH, the receiver may also determine the frame ID. In addition, the receiver can also determine the preferred transmitter beam ID (or transmitter beam IDs).

The receiver may then feedback information such as the cell ID, signal quality indication of the cell, preferred transmitter beam ID of the cell, and preferred receiver beam ID in communication with the cell, back to a transmitter or network. The feedback can be carried in a variety of feedback channels such as a random access channel, random access report, handover request or report, or measurement report.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for use in a base station, the method comprising:
   transmitting a plurality of primary synchronization channel (PSC) symbols to a mobile station in a slot of a subframe of a frame-based wireless communication system; and
   transmitting a plurality of secondary synchronization channel (SSC) symbols to the mobile station in the slot of the subframe, wherein a gap separates the plurality of PSC symbols from the plurality of SSC symbols within the slot of the subframe, and the gap is at least one Orthogonal Frequency Division Multiplexing (OFDM) symbol long.

2. The method of claim 1, further comprising:
transmitting a plurality of broadcast control channel (BCH) symbols to the mobile station in the slot of the subframe.

3. The method of claim 1, wherein the plurality of PSC symbols comprise consecutive symbols in the slot.

4. The method of claim 3, further comprising:
generating the plurality of consecutive PSC symbols by repeating a sequence of segments, each segment comprising a plurality of samples.

5. The method of claim 4, wherein a number of segments in each PSC symbol is based in part on a length of a cyclic prefix of the each PSC symbol.

6. The method of claim 3, wherein the plurality of consecutive PSC symbols are used by the mobile station to determine a preferred receiver beam.

7. The method of claim 1, wherein a detection of the PSC symbols is attempted by the mobile station using each of a plurality of receiver beams and, when a received signal strength associated with the PSC symbols is greater than a predetermined threshold, the mobile station determines that the PSC is detected.

8. A base station, comprising:
a transmitter path configured to:
transmit a plurality of primary synchronization channel (PSC) symbols to a mobile station in a slot of a subframe of a frame-based wireless communication system; and
transmit a plurality of secondary synchronization channel (SSC) symbols to the mobile station in the slot of the subframe, wherein a gap separates the plurality of PSC symbols from the plurality of SSC symbols within the slot of the subframe, and the gap is at least one Orthogonal Frequency Division Multiplexing (OFDM) symbol long.

9. The base station of claim 8, the transmitter path further configured to:
transmit a plurality of broadcast control channel (BCH) symbols to the mobile station in the slot of the subframe.

10. The base station of claim 8, wherein the plurality of PSC symbols comprise consecutive symbols in the slot.

11. The base station of claim 10, the transmitter path further configured to:
generate the plurality of consecutive PSC symbols by repeating a sequence of segments, each segment comprising a plurality of samples.

12. The base station of claim 11, wherein a number of segments in each PSC symbol is based in part on a length of a cyclic prefix of the each PSC symbol.

13. The base station of claim 10, wherein the plurality of consecutive PSC symbols are used by the mobile station to determine a preferred receiver beam.

14. The base station of claim 8, wherein a detection of the PSC symbols is attempted by the mobile station using each of a plurality of receiver beams and, when a received signal strength associated with the PSC symbols is greater than a predetermined threshold, the mobile station determines that the PSC is detected.

15. A mobile station, comprising:
a receiver path configured to:
receive a plurality of primary synchronization channel (PSC) symbols from a base station in a slot of a subframe of a frame-based wireless communication system; and
receive a plurality of secondary synchronization channel (SSC) symbols from the base station in the slot of the subframe, wherein a gap separates the plurality of PSC symbols from the plurality of SSC symbols within the slot of the subframe, and the gap is at least one Orthogonal Frequency Division Multiplexing (OFDM) symbol long.

16. The mobile station of claim 15, the receiver path further configured to:
receive a plurality of broadcast control channel (BCH) symbols from the base station in the slot of the subframe.

17. The mobile station of claim 15, wherein the plurality of PSC symbols comprise consecutive symbols in the slot.

18. The mobile station of claim 17, wherein the plurality of consecutive PSC symbols is generated by repeating a sequence of segments, each segment comprising a plurality of samples.

19. The mobile station of claim 18, wherein a number of segments in each PSC symbol is based in part on a length of a cyclic prefix of the each PSC symbol.

20. The mobile station of claim 17, the receiver path further configured to:
determine a preferred receiver beam based on the plurality of received consecutive PSC symbols.

21. The mobile station of claim 15, the receiver path further configured to:
attempt to detect the PSC symbols using each of a plurality of receiver beams; and
determine that the PSC is detected when a received signal strength associated with the PSC symbols is greater than a predetermined threshold.

* * * * *